United States Patent
Singh et al.

(10) Patent No.: US 8,744,474 B1
(45) Date of Patent: Jun. 3, 2014

(54) SYSTEM AND METHOD FOR ADJUSTING TRACKING AREA SIZE BASED ON REDUNDANCY

(75) Inventors: Jasinder P. Singh, Olathe, KS (US); Sachin R. Vargantwar, Overland Park, KS (US); Maulik K. Shah, Overland Park, KS (US); Deveshkumar Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 13/549,596

(22) Filed: Jul. 16, 2012

(51) Int. Cl.
*H04W 72/00* (2009.01)

(52) U.S. Cl.
USPC .......................................... 455/453; 455/434

(58) Field of Classification Search
USPC ......... 370/218, 221, 236, 242, 252, 328, 329, 370/311, 332; 455/434, 435.1, 436, 453, 455/456.1–456.2, 561
See application file for complete search history.

(56) References Cited

U.S. PATENT DOCUMENTS

| | | | |
|---|---|---|---|
| 2008/0102826 A1* | 5/2008 | Voyer et al. ................. | 455/432.1 |
| 2009/0318161 A1* | 12/2009 | Lopes ............................ | 455/453 |
| 2010/0035654 A1* | 2/2010 | Iwamura et al. ............... | 455/561 |
| 2010/0080186 A1* | 4/2010 | Guo et al. ...................... | 370/329 |
| 2010/0105386 A1* | 4/2010 | Guo ............................ | 455/435.1 |
| 2010/0120448 A1* | 5/2010 | Iwamura et al. ............ | 455/456.1 |
| 2010/0124933 A1* | 5/2010 | Chowdhury et al. .......... | 455/453 |
| 2010/0184432 A1* | 7/2010 | Yano et al. .................. | 455/435.1 |
| 2010/0220680 A1* | 9/2010 | Ramankutty et al. ......... | 370/329 |
| 2010/0281151 A1* | 11/2010 | Ramankutty et al. ......... | 709/223 |
| 2010/0285816 A1 | 11/2010 | Vos | |
| 2010/0299419 A1* | 11/2010 | Ramankutty et al. ......... | 709/221 |
| 2011/0122779 A1* | 5/2011 | Meirosu et al. ............... | 370/252 |
| 2011/0122845 A1* | 5/2011 | Meirosu et al. ............... | 370/332 |
| 2011/0170423 A1* | 7/2011 | Engstr .......................... | 370/242 |
| 2011/0235505 A1* | 9/2011 | Eswara et al. ................ | 370/221 |
| 2011/0263274 A1* | 10/2011 | Fox et al. .................... | 455/456.2 |
| 2011/0306363 A1* | 12/2011 | Wang et al. ................ | 455/456.1 |
| 2012/0023360 A1* | 1/2012 | Chang et al. .................. | 714/4.11 |
| 2012/0039299 A1* | 2/2012 | Teyeb et al. .................... | 370/331 |
| 2013/0083650 A1* | 4/2013 | Taleb et al. .................... | 370/218 |
| 2013/0100813 A1* | 4/2013 | Velamati et al. ............... | 370/236 |

* cited by examiner

*Primary Examiner* — Nathan Taylor

(57) ABSTRACT

A method and corresponding system is provided for adjusting the size of tracking areas. In one embodiment of the method, a pool of RAN entities determines that there has been a reduction in the number of RAN entities in the pool of RAN entities, and in response to the determining, the pool of RAN entities reduces the size of at least one tracking area assigned to the pool of RAN entities. In another embodiment of the method, a pool of RAN entities determines that there has been an increase in the number of RAN entities in the pool of RAN entities, and in response to the determining, the pool of RAN entities increases the size of at least one tracking area assigned to the pool of RAN entities.

14 Claims, 8 Drawing Sheets

SYSTEM AND METHOD FOR ADJUSTING TRACKING AREA SIZE BASED ON REDUNDANCY

BACKGROUND

In typical cellular wireless communication systems, wireless communication devices (e.g., cell phones, personal digital assistants, laptops, netbooks, tablets, and/or other wirelessly equipped devices, any of which may be referred to as a user equipment (UE) for brevity) subscribe to service from a given cellular wireless service provider. In practice, a service provider will operate one or more networks (sometimes referred to as radio access networks (RANs)) including base stations that radiate to define wireless coverage areas where the subscriber UEs can operate.

Through each base station (and corresponding RAN), a UE can obtain connectivity to other networks such as the public switched telephone network (PTSN) and the Internet. Further, each RAN may include one or more radio network controllers (RNCs), mobility management entities (MMEs), or the like, which may be integrated with or otherwise in communication with the base stations, and which may include or be in communication with a switch or gateway that provides connectivity with one or more transport networks. Conveniently with this arrangement, a UE that is positioned within coverage of the RAN may communicate with a base station and in turn, via the base station, with other served devices or with other entities on the transport network.

Generally, wireless communications between a given UE and a serving base station in a RAN are carried out in accordance with one or more air interface protocols that define a mechanism for wireless exchange of information between the UE and the base station. Typically, an air interface protocol will define a "forward link" encompassing communications from the base station to the UE and a "reverse link" encompassing communications from the UE to the base station. Further, each of these links may be structured to define particular channels on which certain types of data may be transmitted. These channels may be defined through the use of various mechanisms, including for example, time division multiplexing, code division multiplexing (e.g., spread-spectrum modulation), frequency division multiplexing, as well as others.

The forward link, for example, may define (i) a pilot channel on which the RAN may broadcast a pilot signal to allow UEs to detect wireless coverage, (ii) system parameter channels (e.g., an overhead channel) on which the RAN may broadcast system operational parameters for reference by UEs so that the UE can then seek network access, (iii) paging channels on which the RAN may broadcast page messages to alert UEs of incoming communications, and (iv) traffic channels on which the RAN may transmit bearer traffic (e.g., application data) for receipt by UEs. And the reverse link, for example, may define (i) access channels on which UEs may transmit "access probes" such as registration messages and call origination requests, and (ii) traffic channels on which UEs may transmit bearer traffic for receipt by the RAN.

In operation, when a RAN seeks to communicate with a UE (e.g., to establish an incoming voice call or transmit incoming packet data), the RAN may first page the UE on a paging channel. The purpose of paging the UE may be to determine whether the UE is still within range of a wireless coverage area, and if so, to notify the UE of the incoming communication, and perhaps assign a traffic channel to the UE. To carry out a page, the RAN may transmit to the base station that is currently serving the UE some indication of the reason for the page (e.g., that there is an incoming call or data packet directed to the UE). In turn, the serving base station may use this indication to generate a page record, which the base station may transmit to the UE in one way or another. The UE may then reply to the base station with a page-response message (PRM), or some other message indicating successful receipt of the page record.

Given the scarcity of paging channel resources, some wireless communication networks implement a "zone-based" paging scheme. In such a scheme, the base stations in the RAN are divided into tracking areas, each with a respective tracking area ID. To facilitate paging on a zone basis, each base station in the RAN may broadcast as one of its overhead parameters the tracking area ID for the tracking area in which the base station is located. A UE operating in the network may then programmatically monitor the tracking area IDs specified in the overhead messages and may register with the network by, for example, transmitting to the RAN a "tracking area update" message when the UE detects that it has moved into a new tracking area (or for other reasons).

A RAN entity that facilitates paging (such as a switch), may collect and store (in a database, for example) these tracking area update messages as a way to keep track of the tracking areas in which the UEs are located. When a switch or other RAN component seeks to page a certain UE, the switch or other component may then refer to the database and send the page message to just those base stations that are within the tracking area of the UE's most recent registration.

OVERVIEW

In some network architecture configurations, paging is managed by RAN devices referred to as mobility management entities (MMEs). In accordance with an example zone-based paging scheme, MMEs may be grouped into pools, with each pool managing the paging process for several tracking areas. For instance, a pool of MMEs managing paging for several tracking areas may receive tracking area update messages from subscriber UEs that move into coverage of the tracking areas. And the pool of MMEs may transmit to the base stations of a given tracking area page messages destined for UEs operating in that tracking area. For redundancy purposes, a pool of MMEs often includes more than one MME. This way, if one MME becomes non-operational for some reason, the remaining MMEs can continue to carry out paging operations for the tracking areas, resulting in little to no interruption of the paging functionality.

In practice, an individual MME may have capacity limits. Particularly, an individual MME may have a limit on the number of base stations per tracking area for which that MME can manage the paging process. Such a limit may be the result of the MME's hardware or processing constraints, for instance. By way of example, a typical MME capacity limit is about twenty base stations per tracking area; however, other limits are possible as well.

In accordance with one tracking-area arrangement, tracking areas assigned to a pool of MMEs are sized according to the capacity limits of an individual MME. For instance, in embodiments of this arrangement in which an individual MME has a capacity limit of twenty base stations per tracking area, the tracking areas assigned to a pool of MMEs will be arranged to have at most twenty base stations. Consequently, in the event that all MMEs in the pool are non-operational except one, that remaining MME can still manage the paging functionality for the tracking areas originally assigned to the pool without exceeding its capacity limits. However, when there is redundancy in the MME pool (i.e., when more than one MME in the pool is operational), the redundant MMEs provide extra capacity that goes unused.

Disclosed herein is a different tracking-area arrangement designed help use available network resources, such as the extra capacity of redundant MMEs. In accordance with the arrangement, tracking areas assigned to a pool of MMEs are sized according to how many operational MMEs are in the pool. For instance, a tracking area assigned to a pool having just one MME may be sized according to the capacity limit of that MME. Tracking areas assigned to a pool having two MMEs may be sized larger than the capacity limit of an individual MME. And a tracking area assigned to a pool of three MMEs may be sized larger still. To carry out paging in such an arrangement, the MMEs in the pool may share the paging responsibilities for a given tracking area. Particularly, when it is desired to page a UE operating in a tracking area that is larger than the capacity limit of an individual MME, one of the MMEs in the pool may deliver page messages to some of the base stations of the tracking area, whereas another MME in the pool may deliver page messages to the other base stations of the tracking area. Other configurations are possible as well.

As a general matter, a wireless network arranged with larger tracking areas may, in some cases, be more desirable than a wireless network arranged with smaller tracking areas. This may be the case because larger tracking areas typically result in fewer instances of UEs moving into a new tracking areas. As such, in networks with larger tracking areas, UEs will, on average, tend to send fewer tracking area update messages. This, in turn, reduces the reverse link traffic in the network and may result less interference for subscriber UEs. Other advantages of larger tracking areas exist as well.

Also disclosed herein is a method designed to help use the available network resources, such as the extra capacity of redundant MMEs. In one embodiment of the method, a pool of MMEs (or other RAN entities) may determine that there is a decrease in redundancy in the pool, and in response to this determining, decrease the size of at least one tracking area assigned to the pool. A pool of MMEs may determine that there is a decrease in redundancy in the pool, for example, by determining that at least one MME in the pool has become non-operational, reassigned to another pool by a network operator (or other entity), or is otherwise no longer available in the pool. The pool may decrease the size of a tracking area by, for example, removing some of the base stations from that tracking area and causing them to form a new tracking area, or alternatively, become part of an existing tracking area. In one application of this, the pool of MMEs may instruct several base stations of a given tracking area to change the tracking area IDs that they each broadcast to UEs. Other examples are possible as well.

In another embodiment of the method, a pool of MMEs (or other RAN entities) may determine that there is an increase in redundancy in the pool, and in response to this determining, increase the size of at least one tracking area assigned to the pool. A pool of MMEs may determine that there is an increase in redundancy in the pool, for example, by determining that an MME in the pool that was once non-operational has since become operational, an MME has been reassigned to the pool (e.g., from another pool) by a network operator (or other entity), or an additional MME has otherwise become available in the pool. The pool may increase the size of a given tracking area by, for example, joining the given tracking area to another tracking area together, or alternatively, moving some base stations from another tracking area to the given tracking area. In one application of this, the pool of MMEs may instruct some base stations of another tracking area to change the tracking area IDs that they each broadcast to UEs to the tracking area ID of the given tracking area. Other examples are possible as well.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the claims.

BRIEF DESCRIPTION OF THE DRAWINGS

Various embodiments of the method are described herein with reference to the following drawings, wherein like numerals denote like entities.

DETAILED DESCRIPTION

1. Example Communication System Architecture

Figure 1:
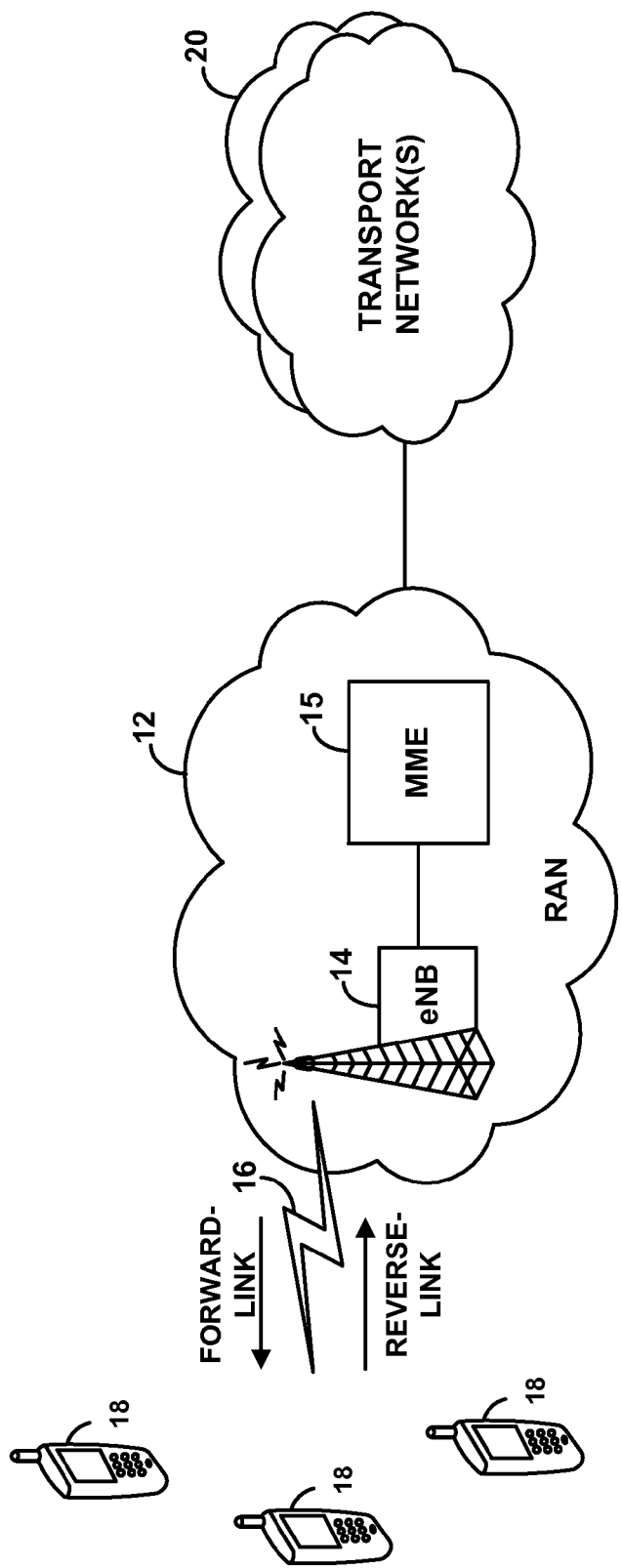
FIG. 1 depicts an example communication system, in which an example embodiment of the described arrangement can be implemented.

Referring to the drawings, as noted above, FIG. 1 is a simplified block diagram of an example wireless communication system in which at least one embodiment of the present method can be implemented. It should be understood that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in data storage or another such non-transitory machine-readable medium.

At a general level, as shown in FIG. 1, the example wireless communications system includes at its core a RAN 12 having a base station, such as eNodeB (eNB) 14, that radiates to define a wireless air interface 16 through which the eNB may communicate with at least one UE 18. The eNB 14 is in turn shown coupled to a Mobility Management Entity (MME) 16 that typically coordinates functionality between eNB 14 and other eNBs (not shown). RAN 12 then provides connectivity with one or more transport networks 20, such as the public switched telephone network (PSTN) or the Internet for instance. With this arrangement, a UE 18 that is positioned within coverage of the base station and that is suitably equipped may engage in air interface communication with the base station and may thereby communicate with remote entities on the transport network(s) 20 and/or with other UEs served by the RAN.

At a more complex level, but still by way of example, the network architecture of RAN 12 may be configured to communicate with UEs 18 over the air interface 16 according to one or more agreed air interface protocols, examples of which include Long Term Evolution (LTE) Code Division Multiple Access (CDMA), Universal Mobile Telecommunications System (UMTS), Wireless Interoperability for Microwave Access (WiMAX), IDEN, GSM, GPRS, EDGE, MMDS, WIFI, BLUETOOTH, and other protocols now known or later developed. For example, in a UMTS system configured to operate according to LTE standards, the base station is usually referred to as an eNodeB or an eNB and the entities that coordinate functionality between the several eNodeBs of the network are usually referred to as MMEs. In a CDMA system configured to operate according to the IS-2000 standard (sometimes referred to as 1xRTT) or the IS-856 standard (sometimes referred to as 1xEV-DO), the base station is usually referred to as a Base Transceiver Station (BTS) and is usually under the control of a Base Station Controller (BSC). Other architectures and operational configurations of a RAN are possible as well.

As further shown in FIG. 1, the air interface 16 generally defines a forward-link that carries wireless communications from the RAN 12 to the UEs 18 and a reverse-link that carries wireless communications from the UEs 18 to the RAN 12. Depending on the protocol, these links may be structured in various ways. At a high level, for instance, the eNB 14 may provide service on one or more frequency channels or bands, with forward-link communications occupying one band and reverse-link communications occupying another band. Alternatively, forward-link and reverse-link communications may be carried out on a common frequency band and may be differentiated through time division multiplexing and/or other techniques.

As mentioned above, the forward link, for example, may define various sub-channels including (i) a pilot channel, (ii) system parameter channels, (iii) paging channels, and (iv) traffic channels. And as also mentioned above, the reverse link, for example, may define various sub-channels including (i) access channels, and (ii) traffic channels.

2. Example Network Device

Figure 2:
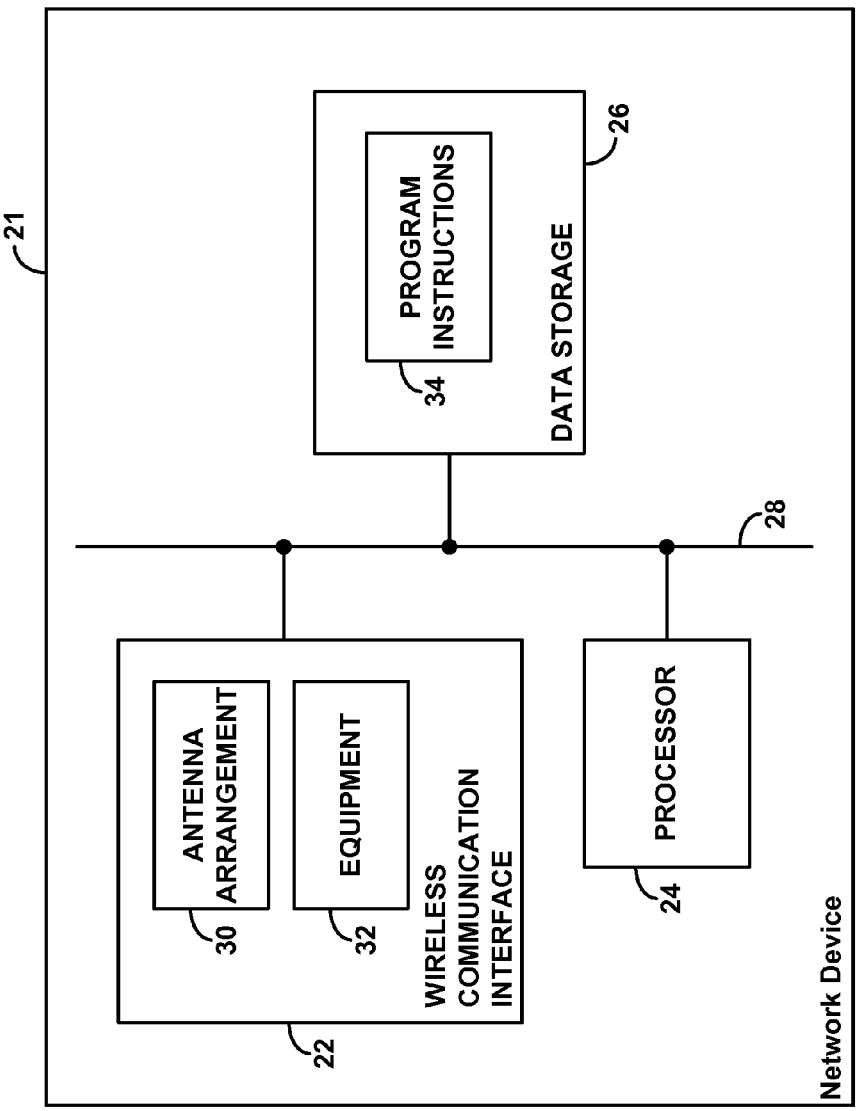
FIG. 2 depicts an example network device arranged to implement the present method.

FIG. 2 is a simplified block diagram of an example network device 21 that may be configured to carry out network-side functions described herein. Network device 21 may be representative of eNB 14, MME 16, MME 16 integrated with eNB 14, or some other entity not shown but associated with RAN 12 or transport network(s) 20 in FIG. 1, for instance, such as a BTS, access node, access point, or a Node-B (whether macro, femto or the like). As shown in FIG. 2, the network device may include a wireless communication interface 22, a processor 24, and data storage 26, all of which may be coupled together by a system bus, network or other connection mechanism 28.

As further shown, wireless communication interface 22 may include an antenna arrangement 30 and associated equipment 32, the combination of which may enable network device 21 to communicate with UEs (or perhaps other network devices) on a network such as RAN 12. For example, wireless communication interface 22 may enable network device 21 to transmit forward-link communications to UEs, and receive reverse-link communication from UEs. Accordingly, the antenna arrangement 30 may be tower mounted and configured to radiate to define one or more coverage areas in which UE 18 operates. The equipment 32 may include a trunk, optical link, or an any Ethernet network interface card or other physical connection that can be coupled with any other entity on the RAN 12 or transport network(s) 20. By way of example, the equipment 32 may include a module, such as an CSMT™-series chipset made by Qualcomm Inc. of San Diego, Calif., and may support wireless packet-data communications according to a CDMA family of protocols. Other modules that support others communications protocols are possible as well.

Processor 24 may then comprise one or more general purpose processors (e.g., microprocessors) and/or special-purpose processors (e.g., digital signal processors and/or application specific integrated circuits) and may be integrated in whole or in part with the wireless communication interface. And data storage 26 may comprise one or more volatile and/or non-volatile storage components and may be integrated in whole or in part with processor 24.

As shown, data storage 26 may hold program instructions 34, which may be executable by processor 24 to carry out various base station or RAN 12 functions described herein. For instance, in accordance with the program instructions, the processor may function to determine that there has been a reduction in the number of MMEs in a pool of MMEs and, in response to this determination, decrease the size of at least one tracking area assigned to the pool of MMEs. In addition, in accordance with the program instructions, the processor may function to determine that there has been an increase in the number of MMEs in a pool of MMEs and, in response to this determination, increase the size of at least one tracking area assigned to the pool of MMEs. As such, the processor 24 programmed with instructions 34 may define part or all of a controller for controlling operation of the network device 21. Alternatively or additionally, however, such control functionality could be provided external to the network device 21, such as within some other entity not shown but associated with RAN 12 or transport network(s) 20 in FIG. 1. Such an entity may be communicatively linked with the network device 21 and could serve to control aspects of the network device 21 and RAN operation generally.

3. Example User Equipment

Figure 3:
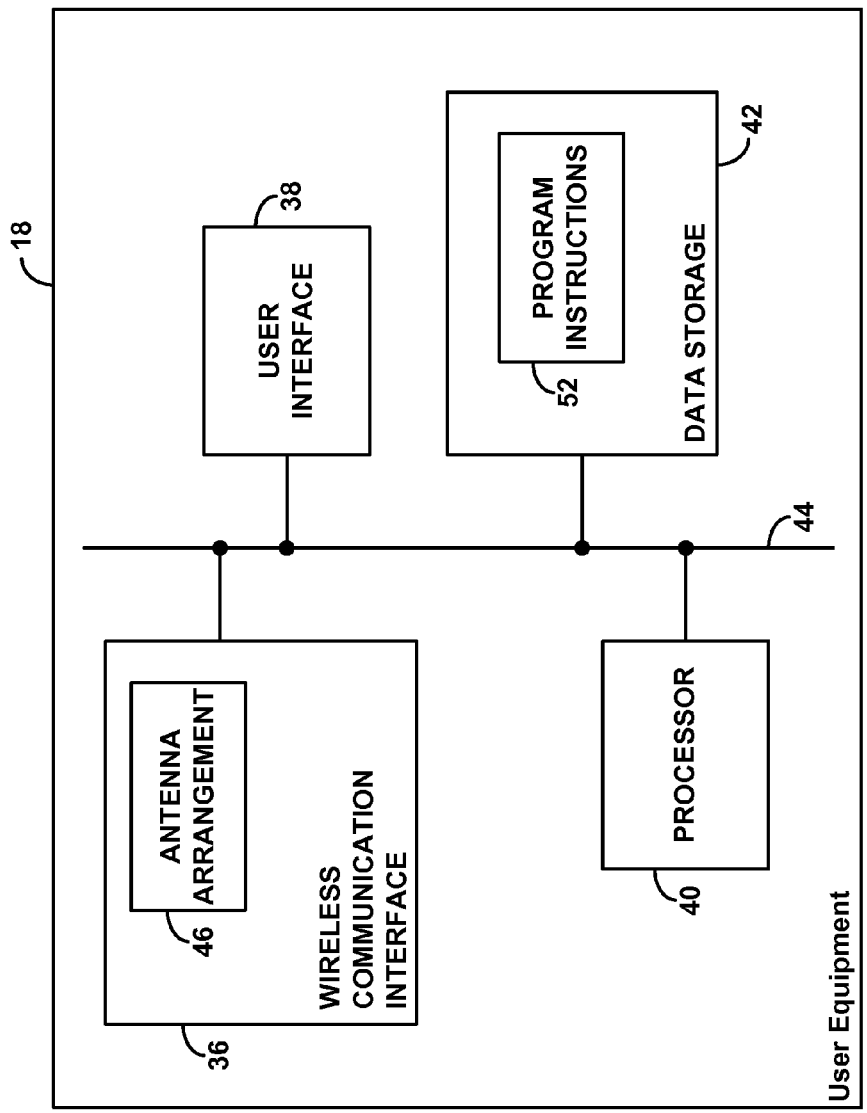
FIG. 3 depicts an example user equipment arranged to implement the present method.

FIG. 3 is next a simplified block diagram of a representative UE 18 (also possibly referred to as, a mobile station, access terminal, a wireless communication device, or the like), such as a cellular telephone, wirelessly equipped tablet or personal computer, embedded wireless communication module, for instance. As shown, the representative UE may include a wireless communication interface 36, a user interface 38, a processor 40, and data storage 42, all of which may be coupled together by a system bus, network, or other connection mechanism 44.

Wireless communication interface 36 may comprise an antenna arrangement 46 and associated components, for engaging in communication with serving base stations such as eNB 14, such as to transmit data and control information to the base stations and to receive data and control information from the base stations. For instance, the wireless communications interface 36 may include a mobile station modem, such as an MSMT™-series chipset made by Qualcomm Inc.

of San Diego, Calif. Wireless communication interface 36 may support one or more wireless packet-data communication protocols.

User interface 38 may then facilitate interaction with a user of the UE if applicable. As such, the user interface may include output components such as a display screen, loudspeaker, and headphone jack, and input components such as a keypad, a touch-sensitive screen, and a camera.

Processor 40 may then comprise one or more general purpose processors and/or special-purpose processors and may be integrated in whole or in part with wireless communication interface 36. And data storage 42 may comprise one or more volatile and/or non-volatile storage components and may be integrated in whole or in part with processor 40. As shown, data storage 42 may hold program instructions 52, which may be executable by processor 40 to carry out various UE functions described herein.

4. Example Tracking Areas and Operations

Figure 4:
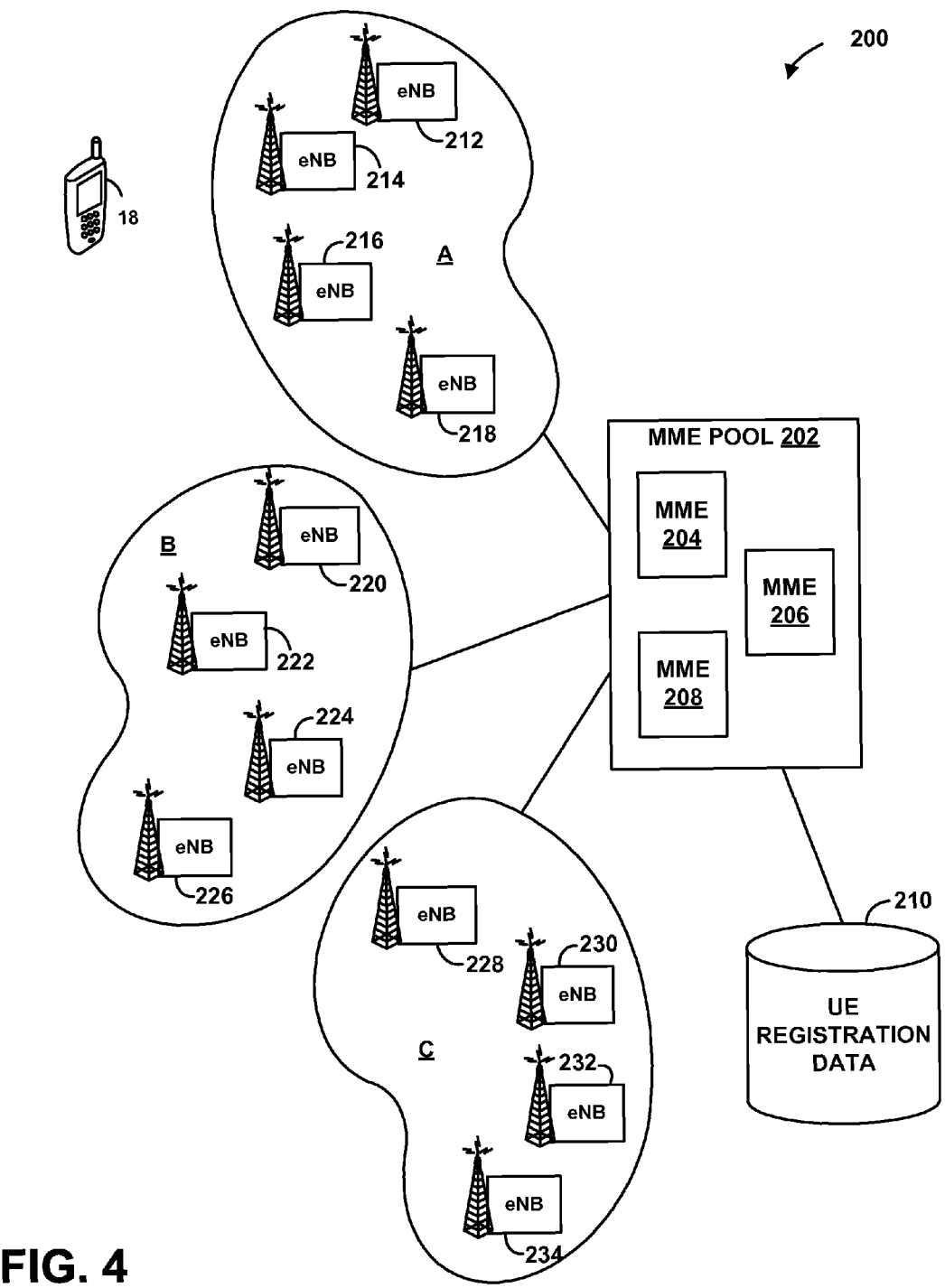
FIG. 4 depicts an example arrangement of tracking areas in which the present method can be implemented.

FIG. 4 is a block diagram depicting a portion of an example wireless network 200. As shown in FIG. 4, network 200 includes twelve eNBs 212-234, which are grouped into three different tracking areas A, B, and C to facilitate the paging of subscriber UEs operating in network 200, such as UE 18. In particular, tracking area A includes eNBs 212-218, tracking area B includes eNBs 220-226, and tracking area C includes eNBs 228 to 234. Tracking areas A, B, and C may also include additional eNBs, which are not shown for brevity's sake. Furthermore, network 200 may include additional eNBs (not shown) that may or may not be grouped into additional tracking areas.

As further shown, network 200 includes an MME pool 202 that includes three MMEs 204-208. The MME pool 202 is shown communicatively coupled to a UE registration database 210, which may store location information that indicates the most recent tracking area of UEs operating in network 200. The UE registration database may store other information as well. Generally, the MME pool 202 in combination with the database 210 may manage the tracking and paging of UEs operating in network 200.

To facilitate the tracking and paging of subscriber UEs, an eNB may broadcast over an air interface an identification of the tracking area in which the eNB is located. In network 200, for example, eNBs 212-218 may broadcast tracking area ID "A," eNBs 220-226 may broadcast tracking area ID "B," and eNBs 228-234 may broadcast tracking area ID "C." Accordingly, when, for example, UE 18 moves into coverage of one of the eNBs in tracking area A, say eNB 216, UE 18 may detect the broadcast of tracking area ID "A" by eNB 216. Consequently, UE 18 may inform the MME pool that UE 18 is within coverage of tracking area A so that the MME pool 202 knows where to transmit a page message destined for UE 18. In particular, UE 18 may transmit a tracking area update message to eNB 216, which in turn, may forward the tracking area update message to MME pool 202. In response, MME pool 202 may update UE registration database 210 with an indication that UE 18 is operating in tracking area A. Thus, in the event that MME pool 202 needs to page UE 18, MME pool 202 may refer to UE registration database 210, determine that UE 18 is operating in tracking area A, and transmit the page message to the base stations of tracking area A. To keep the MME pool apprised of the UE's location, UE 18 may transmit a new tracking area update message when it moves into coverage of a new tracking area.

As mentioned above, an MME pool, such as MME pool 202, often includes more than one MME for redundancy. Typically, when paging a UE, each MME in the pool will transmit a copy of the page message to the eNBs of the UE's tracking area. This redundancy may provide a higher degree of paging reliability. For instance, in the event that one MME becomes non-operational for some reason, there may be little to no interruption in the paging process as a result of the redundant MME operation.

As also mentioned above, for one reason or another, individual MMEs may have capacity constraints that limit the size and, perhaps, the number of tracking areas the MMEs can manage. For example, a typical MME may have a capacity limit of about sixteen tracking areas at twenty eNBs per tracking area, although other capacity limits are possible as well. In view of these capacity limits, one approach for network configuration is to configure eNBs into tracking areas that are sized according to the capacity limits of an individual MME. This way, if all MMEs in the pool become non-operational except for one, that one MME may still handle the paging traffic for the tracking areas without exceeding the MME's capacity limits. In this approach, the sizes of the tracking areas may not change over time; hence, this approach may be referred to as the "static approach."

Referring back to network 200 in FIG. 4, an individual MME in the pool of MMEs 202 may have a capacity limit of four eNBs per tracking area. In accordance with the static approach, the tracking areas (A, B, and C) assigned to MME pool 202 are sized to each have no more than four eNBs. Of course, this capacity limit is merely an example, and other capacity limits, such as twenty eNBs per tracking area, are possible as well.

In accordance with another network configuration approach, referred to as the "adjustable approach," tracking areas that are assigned to an MME pool may be sized according to the number of operational MMEs in the pool. Such an approach may make more efficient use of network resources, such as the paging capacity of redundant MMEs, than the static approach. In one embodiment of the adjustable approach, for instance, the size of the tracking areas assigned to the MME pool may be directly proportional to the number of operational MMEs in the MME pool. To facilitate this, the MME pool may be configured to adjust the size of a tracking area upon a change to the number of operational MMEs in the MME pool. For example, in the event that there is a decrease in the number of operational MMEs in a pool of MMEs, the size of tracking areas assigned to the pool may be reduced. And in the event that there is an increase in the number of operational MMEs in a pool of MMEs, the size of tracking areas assigned to the pool may be increased. Other ways to facilitate this network configuration approach are possible as well.

Figure 5:
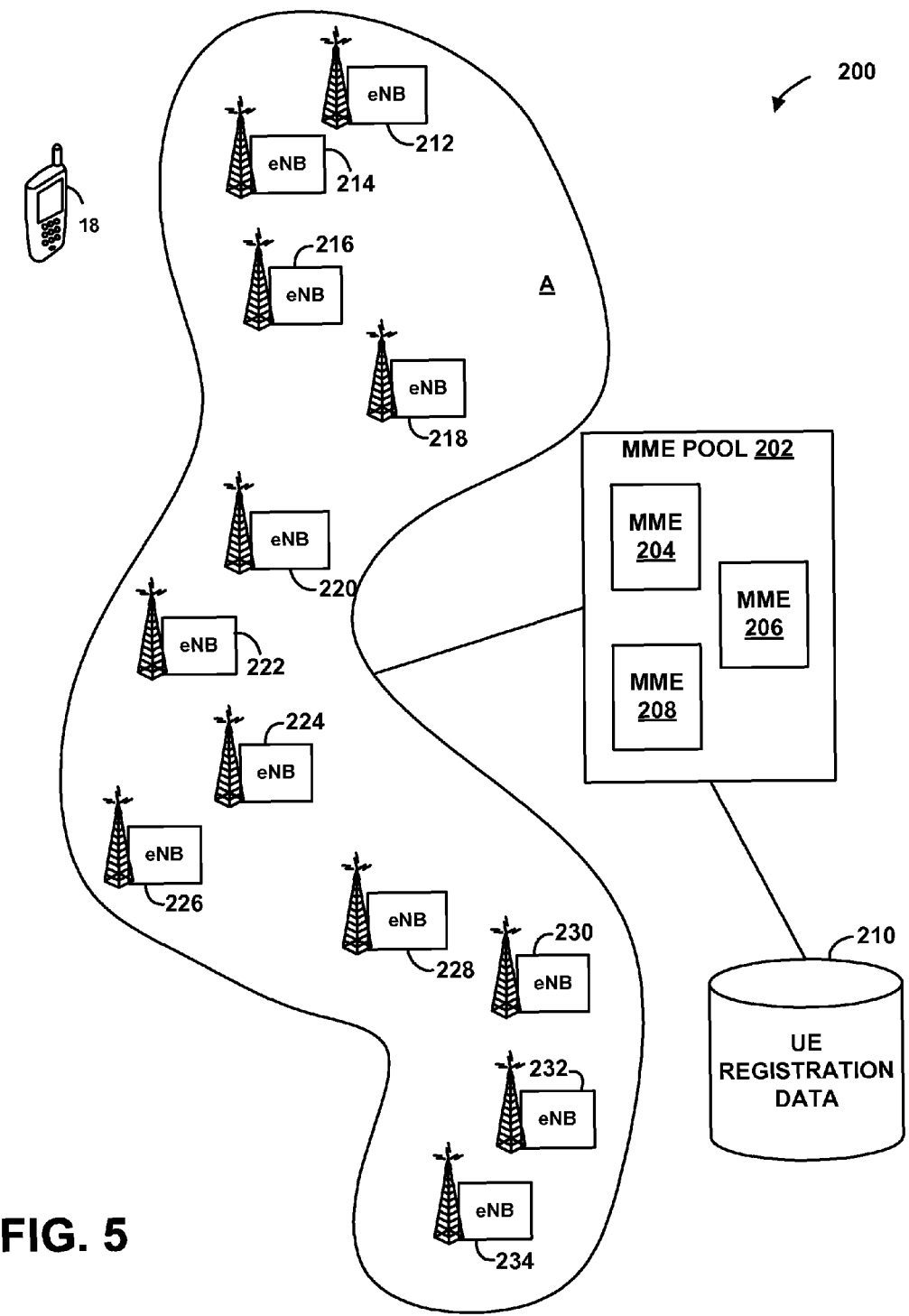
FIG. 5 depicts an example arrangement of tracking areas in which the present method can be implemented.

FIG. 5 depicts another arrangement of network 200 in accordance with one embodiment of the adjustable approach. As depicted, there are three operational MMEs 204-208 in the MME pool 202. Consequently, the eNBs 212-234 are arranged into one large tracking area with tracking area ID A. In some embodiments of this approach, the size of a tracking area may be larger than the capacity limit of an individual MME. For instance, as depicted in FIG. 5, tracking area A includes twelve eNBs; however, as mentioned above, the capacity limit of an individual MME in network 200 may be four eNBs. Therefore, to address this, the MME pool 202 may divide up the paging responsibilities for tracking area A among the MMEs in the pool, rather than transmit redundant page messages. As an example of this, if MME pool 202 desires to page UE 18, which may be in coverage of tracking area A, MME 204 may send the page to eNBs 212-218, MME 206 may send the page to eNBs 220-226, and MME 208 may send the page to eNBs 228-234. Other examples of dividing the paging responsibilities for a tracking area are possible as well.

As mentioned briefly above, when possible, it may be more preferable to arrange eNBs into one or two larger tracking areas rather than several smaller tracking areas. UEs operating in a network arranged with larger tracking areas typically tend to send, on average, fewer tracking area update messages because they tend not to cross tracking area borders as often as they might in a network arranged with smaller tracking areas. Fewer tracking area update message transmissions by UEs in the network may reduce the overall reverse link traffic in the network. This, as a result, may reduce interference for the UEs, as well as perhaps have other advantages for the network.

Figure 6:
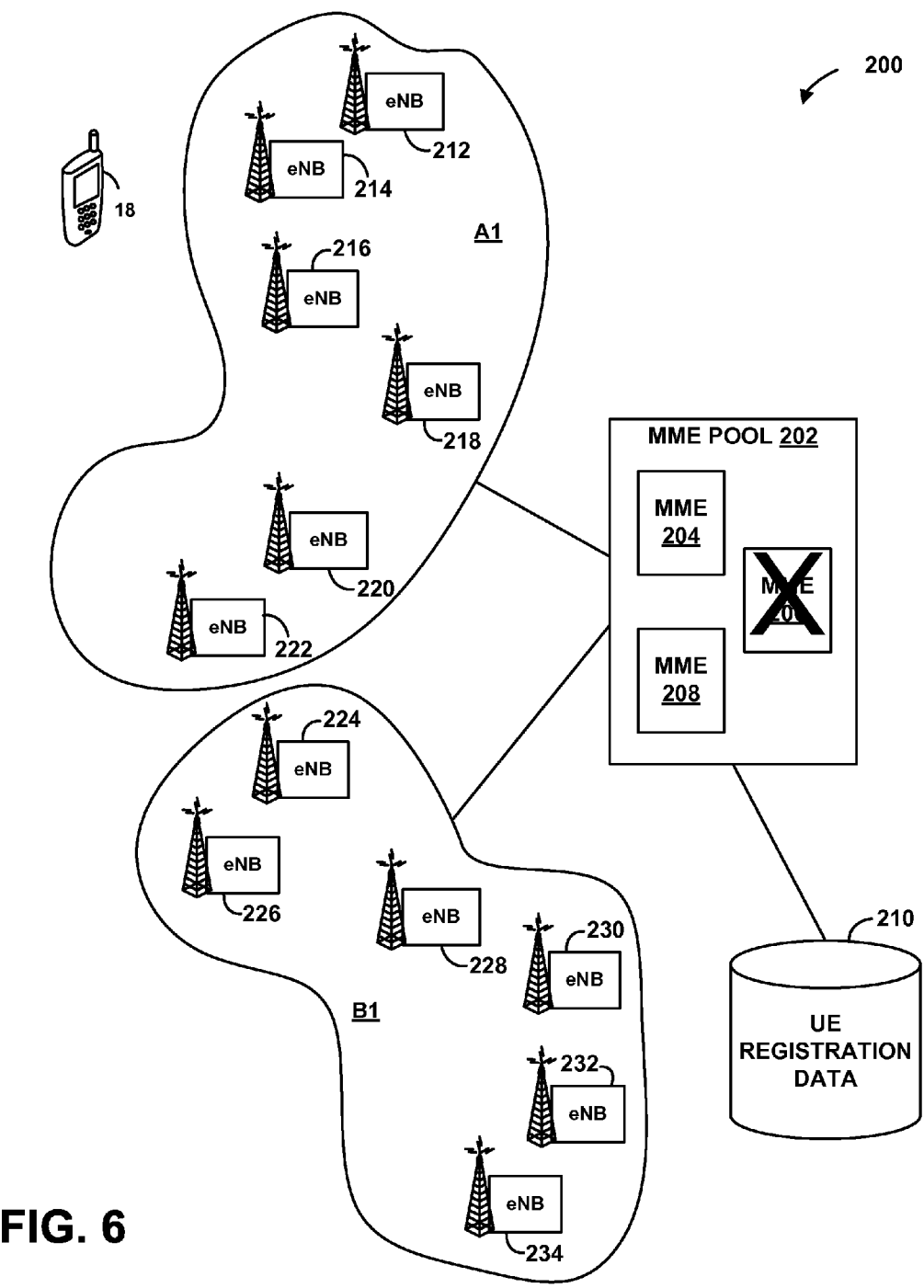
FIG. 6 depicts an example arrangement of tracking areas in which the present method can be implemented.

FIG. 6 depicts another arrangement of network 200 in accordance with another embodiment of the adjustable approach. As depicted (by the X), one MME in the MME pool 202 has become non-operational or is otherwise unavailable to the MME pool 202. Therefore, there are two operational MMEs in the MME pool 202. In response, MME pool 202 has reduced the size of tracking area A. More particularly, MME pool 202 has divided tracking area A into two new tracking areas, A1 and B1, in which eNBs 212-222 are in tracking area A1, and eNBs 224-234 are in tracking area B1. One way to change an eNB's tracking area is for the MME pool 202 to instruct the eNB to change the tracking area ID that it broadcasts. Such an instruction may come in the form of a message transmitted by the MME pool 202 to the eNB. Other ways of changing an eNB's tracking area are possible as well, as are other ways of reducing the size of a tracking area.

The MME pool 202, or more particularly, the individual MMEs in the MME pool 202, may learn that another MME in the MME pool 202 has become non-operational or is otherwise unavailable to the MME pool 202 in any number of different ways. For example, in one embodiment of the approach, the MMEs in an MME pool may receive a message from a network controller or other entity informing them that another MME in the MME pool has become non-operational or otherwise unavailable to the pool. In response to receiving such a message, the MMEs in the MME pool may reduce the size of at least one tracking area assigned to the pool, in accordance with the above description.

In another embodiment of the approach, the MMEs in an MME pool may send "ping" messages to the other MMEs in the pool. In response to receiving a ping message, an MME may send a ping response message back to the sending MME. The sending MME may determine which MMEs responded to its ping message and which MMEs, if any, did not respond to the ping message. In response to determining that at least one MME did not respond to the ping message, the MMEs in the MME pool may reduce the size of at least one tracking area assigned to the pool. Other ways of determining that an MME has become non-operational or otherwise unavailable to an MME pool are possible as well.

As depicted in FIG. 6, for example, in response to MME 206 becoming non-operational, MME pool 202 may send a message to each of eNBs 212-222 instructing them to change their broadcast tracking area IDs from "A" to "A1," and a message to each of eNBs 224-234 instructing them to change their broadcast tracking area IDs from "A" to "B1." As a result of this change, UEs operating in coverage of one of eNBs 212-234 may detect that they were once operating in tracking area A but are now operating in one of tracking areas A1 or B1. Programming logic in the UE may register this a change in tracking areas, and consequently cause the UE to send a tracking area update message informing MME pool 202 of which tracking area the UE is now located.

Again, in some embodiments of this approach, the size of a tracking area may be larger than the capacity limit of an individual MME. For instance, as depicted in FIG. 6, tracking area A1 includes six eNBs and tracking area B1 includes six eNBs; however, as mentioned above, the capacity limit of an individual MME in network 200 may be four eNBs. Therefore, to address this, the MME pool 202 may divide up the paging responsibilities for tracking each area A1 and B1. As an example of this, if MME pool 202 desires to page UE 18, which may be in coverage of tracking area A1, MME 204 may send the page to eNBs 212-218, and MME 208 may send the page to eNBs 220-222. On the other hand, if MME pool 202 desires to page a different UE (not shown), which may be in coverage of tracking area B1, MME 208 may send the page to eNBs 228-234, and MME 204 may send the page to eNBs 224-226. Other examples of dividing the paging responsibilities for a tracking area are possible as well.

In the event that MME 206 becomes operational again or otherwise becomes available to the MME pool 202, MME pool 202 may responsively increase the size of one of the tracking areas, or alternatively combine tracking areas A1 and B1. For example, in response to MME 206 becoming operational, MME pool 202 may combine the tracking areas into one large tracking area, such as FIG. 5 depicts. In so doing, MME pool 202 may also instruct each eNB 212-234 to change its broadcast tracking area ID from "A1" or "B1" (as the case may be) to "A." Other ways to increase the size of a tracking area are possible as well.

An MME may learn that another MME in the MME pool 202 has become operational again or is otherwise available to the MME pool 202 in any number of different ways. For example, in one embodiment of the approach, the MMEs in an MME pool may receive a message from a network controller or other entity informing them that another MME in the MME pool has become operational again or is otherwise available to the pool. In response to receiving such a message, the MMEs in the MME pool may increase the size of at least one tracking area assigned to the pool, in accordance with the above description.

In another embodiment of the approach, as mentioned above, the MMEs in an MME pool may send "ping" messages to the other MMEs in the pool. In response to receiving a ping message, an MME may send a ping response message back to the sending MME. The sending MME may determine which MMEs responded to its ping message and which MMEs, if any, did not respond to the ping message. In response to determining that an MME that was once not responding to ping messages but is now responding to ping messages, the MMEs in the MME pool may increase the size of at least one tracking area assigned to the pool. Other ways of determining that an MME has become operational again or otherwise available to an MME pool are possible as well.

Figure 7:
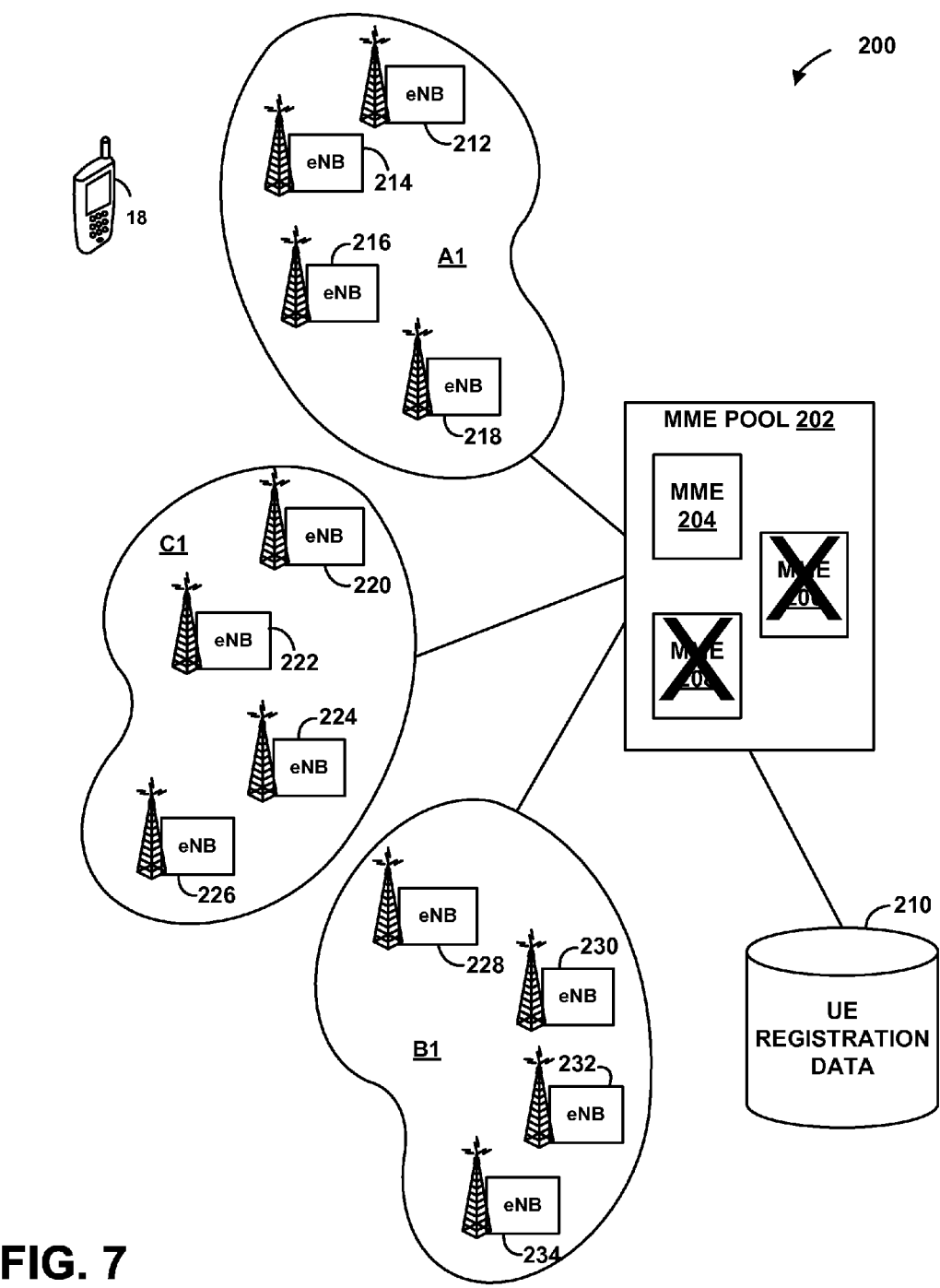
FIG. 7 depicts an example arrangement of tracking areas in which the present method can be implemented.

FIG. 7 depicts another arrangement of network 200 in accordance with one embodiment of the adjustable approach. As depicted (by the Xs), two MMEs in the MME pool 202 have become non-operational or are otherwise unavailable to the MME pool 202. Therefore, there is one operational MME remaining in the MME pool 202. In response, MME pool 202 has reduced the size of each of tracking areas A1 and B1. More particularly, MME pool 202 has moved two eNBs from tracking area A1 (eNBs 220, 222) and two eNBs from tracking area B1 (eNBs 224, 226) into a new tracking area C1. In one example, MME pool 202 created a new tracking area C1 by instructing eNBs 220-226 to change their broadcast tracking area IDs from "A1" or "B1" (as the case may be) to "C1."

Other ways of creating a new tracking area are possible as well. Similar to the procedure described above with respect to FIG. 6, UEs operating in coverage of one of eNBs 220-226 may detect that they have changed tracking areas and may consequently send a tracking area update message to the MME pool 202.

In the event that one of the non-operational or otherwise unavailable MMEs becomes available again, MME pool 202 may increase the size of at least one of the tracking areas A1, B1, and C1. For example, if one unavailable MME become available again, MME pool 202 may return to the tracking area arrangement depicted in FIG. 6, whereas if two unavailable MMEs become available again, MME pool 202 may return to the tracking area arrangement depicted in FIG. 5. However, in other embodiments of the approach, in response to either of these two conditions, MME pool 202 may adjust the tracking areas in other ways.

Figure 8A:
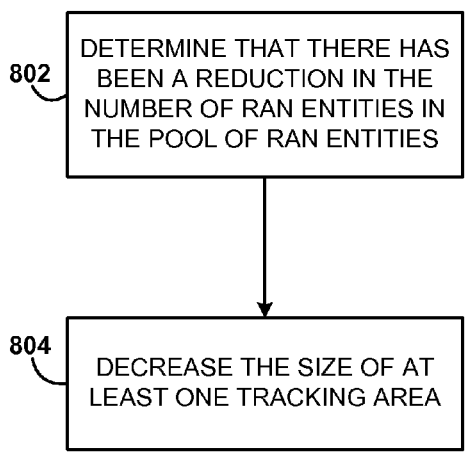
FIG. 8A is a flowchart depicting functions that can be carried out in accordance with the present method.
Figure 8B:
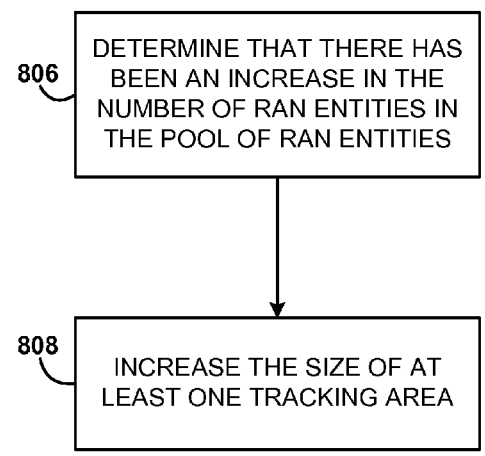
FIG. 8B is a flowchart depicting functions that can be carried out in accordance with the present method.

FIGS. 8A and 8B are flowcharts depicting functions that can be carried out by a RAN entity (such as an MME or other network controller) or a pool of RAN entities (such as a pool of MMEs), in accordance with at least one embodiment of the description set forth above. As shown in FIG. 8A, the process begins at step 802, where a RAN entity determines that there has been a reduction in the number of RAN entities in a pool of RAN entities. For example, the pool of MMEs may determine that at least one MME in the pool has become non-operational or has otherwise become unavailable (e.g., by receiving a message that indicates as much or by determining that an MME has not responded to a ping message). Other ways of determining that there has been a reduction in the number of RAN entities in a pool of RAN entities are possible as well.

The process continues at block 804, where in response to the determining step of block 802, the RAN entity reduces the size of at least one tracking area. As described above, a pool of MMEs may reduce the size of a tracking area by causing some of the eNBs in that tracking area to join another tracking area. In one example, an MME in the pool of MMEs carries this out by instructing those eNBs to change their broadcast tracking area IDs to another existing tracking area, or perhaps a new tracking area. Other ways to decrease the size of a tracking area are possible as well.

As shown in FIG. 8B, the process begins at step 806 where a RAN entity determines that there has been an increase in the number of RAN entities in a pool of RAN entities. For example, a pool of MMEs may determine that at least one MME in the pool has become operational again or has otherwise become available to the pool. For example, the pool of MMEs may determine that at least one MME in the pool has become operational again or has otherwise become available (e.g., by receiving a message that indicates as much or by determining that an MME has begun to respond to ping messages where previously that MME was not responding to ping messages). Other ways of determining that there has been an increase in the number of RAN entities in a pool of RAN entities are possible as well.

The process continues at block 808, where in response to the determining step of block 806, the RAN entity increases the size of at least one tracking area. As described above, a pool of MMEs may increase the size of a given tracking area by causing some of the eNBs from another tracking area to join the given tracking area. In one example, an MME in the pool of MMEs carries this out by instructing those eNBs to change their broadcast tracking area IDs from their existing tracking area IDs to the tracking area ID of the given tracking area. Other ways to increase the size of a tracking area are possible as well.

5. Conclusion

Various embodiments have been described above. Those skilled in the art will understand, however, that changes and modifications may be made to these embodiments without departing from the scope of the claims.

We claim:

1. In a wireless communication system in which a plurality of radio access network (RAN) base stations are organized into a number of tracking areas with each tracking area of the number of tracking areas having a respective size and at least one user equipment (UE) registered therein, wherein each given base station of the plurality of base stations broadcasts over an air interface a respective tracking area ID that is indicative of the tracking area in which the given base station is included, and wherein a pool of RAN entities pages a UE registered in a given tracking area of the number of tracking areas by delivering to base stations included in the given tracking area a paging message destined for the UE, the pool of RAN entities comprising a non-zero number of RAN entities, a method comprising:

the pool of RAN entities determining that there has been a reduction in the number of RAN entities in the pool of RAN entities; and in response to the determining, the pool of RAN entities reducing the size of at least one tracking area, wherein reducing the size of at least one tracking area comprises reorganizing the plurality of base stations into an increased number of tracking areas, and wherein reorganizing the plurality of base stations into an increased number of tracking areas comprises instructing each base station of the plurality of base stations to broadcast a tracking area ID indicative of one of the increased number of tracking areas.

2. The method of claim 1, wherein the pool of RAN entities is a pool of mobility management entities.

3. The method of claim 1, wherein each tracking area of the number of tracking areas includes a respective number of base stations, and wherein reducing the size of at least one tracking area comprises reducing the respective number of base stations included in the at least one tracking area.

4. The method of claim 1, wherein reducing the size of at least one tracking area comprises instructing some of the base stations included in the at least one tracking area to broadcast a different tracking area ID.

5. The method of claim 1, wherein determining that there has been a reduction in the number of RAN entities in the pool of RAN entities comprises determining that one or more RAN entities in the pool of RAN entities has become non-operational.

6. In a wireless communication system in which a plurality of radio access network (RAN) base stations are organized into a number of tracking areas with each tracking area of the number of tracking areas having a respective size and at least one user equipment (UE) registered therein, wherein each given base station of the plurality of base stations broadcasts over an air interface a respective tracking area ID that is indicative of the tracking area in which the given base station is included, and wherein a pool of RAN entities pages a UE registered in a given tracking area of the number of tracking areas by delivering to base stations included in the given tracking area a paging message destined for the UE, the pool of RAN entities comprising a non-zero number of RAN entities, a method comprising:

the pool of RAN entities determining that there has been an increase in the number of RAN entities in the pool of RAN entities; and in response to the determining, the pool of RAN entities increasing the size of at least one tracking area, wherein increasing the size of at least one tracking area comprises reorganizing the plurality of base stations into a reduced number of tracking areas, and wherein reorganizing the plurality of base stations into a reduced number of tracking areas comprises instructing each base station of the plurality of base stations to broadcast a tracking area ID indicative of one of the reduced number of tracking areas.

7. The method of claim 6, wherein the pool of RAN entities is a pool of mobility management entities.

8. The method of claim 6, wherein each tracking area of the number of tracking areas includes a respective number of base stations, and wherein increasing the size of at least one tracking area comprises increasing the respective number of base stations included in the at least one tracking area.

9. The method of claim 6, wherein increasing the size of at least one tracking area comprises instructing some of the base stations included in the at least one tracking area to broadcast a different tracking area ID.

10. The method of claim 6, wherein determining that there has been an increase in the number of RAN entities in the pool of RAN entities comprises determining that a once-non-operational RAN entity in the pool of RAN entities has become operational.

11. A radio access network (RAN) entity arranged to operate in a wireless communication system in which a plurality of base stations are organized into a number of tracking areas with each tracking area of the number of tracking areas having a respective size and at least one user equipment (UE) registered therein, wherein each given base station of the plurality of base stations broadcasts over an air interface a respective tracking area ID that is indicative of the tracking area in which the given base station is included, and wherein a pool of mobility management entities (MMEs) pages a UE registered in a given tracking area of the number of tracking areas by delivering to base stations included in the given tracking area a paging message destined for the UE, the RAN entity comprising:
 a non-transitory computer readable medium (CRM);
 at least one processor; and
 instructions stored on the CRM and executable by the at least one processor for carrying out functions, the functions including:
  the RAN entity determining that an MME in the pool of MMEs has become non-operational;
  in response to determining that an MME in the pool of MMEs has become non-operational, the RAN entity reducing the size of at least one tracking area;
  the RAN entity determining that a once-non-operational MME in the pool of MMEs has become operational; and
 in response to determining that a once-non-operational MME in the pool of MMEs has become operational, the RAN entity increasing the size of at least one tracking area, wherein increasing the size of at least one tracking area comprises reorganizing the plurality of base stations into a reduced number of tracking areas, and wherein reorganizing the plurality of base stations into a reduced number of tracking areas comprises instructing each base station of the plurality of base stations to broadcast a tracking area ID indicative of one of the reduced number of tracking areas.

12. The RAN entity of claim 11, wherein reducing the size of at least one tracking area comprises reorganizing the plurality of base stations into an increased number of tracking areas.

13. The RAN entity of claim 12, wherein reorganizing the plurality of base stations into an increased number of tracking areas comprises instructing each base station of the plurality of base stations to broadcast a tracking area ID indicative of one of the increased number of tracking areas.

14. The RAN entity of claim 6, wherein the RAN entity is one MME in the pool of MMEs.

\* \* \* \* \*